United States Patent
Levine

(10) Patent No.: US 6,188,309 B1
(45) Date of Patent: Feb. 13, 2001

(54) METHOD AND APPARATUS FOR MINIMIZING CREDIT CARD FRAUD

(75) Inventor: Ronald M. Levine, Freehold, NJ (US)

(73) Assignee: AT&T Corp, New York, NY (US)

(*) Notice: Under 35 U.S.C. 154(b), the term of this patent shall be extended for 0 days.

(21) Appl. No.: 09/003,630

(22) Filed: Jan. 7, 1998

(51) Int. Cl.$^7$ ........................................... G07D 7/00
(52) U.S. Cl. ............... 340/5.66; 235/380; 340/5.6; 340/5.4; 340/5.81; 340/5.85
(58) Field of Search ................ 340/825.34, 5.1, 340/5.2, 5.4, 5.6, 5.66, 5.8, 5.81, 5.85; 235/380, 382, 449, 493

(56) References Cited

U.S. PATENT DOCUMENTS

| | | | |
|---|---|---|---|
| 4,575,621 | 3/1986 | Dreifus | 235/380 |
| 4,692,604 | 9/1987 | Billings | 235/493 |
| 4,868,376 * | 9/1989 | Lessin et al. | 235/492 |
| 4,931,991 | 6/1990 | Cvijanovich | 365/52 |
| 5,180,902 | 1/1993 | Schick et al. | 235/380 |
| 5,311,594 | 5/1994 | Penzias | 380/23 |
| 5,311,595 | 5/1994 | Bjerrum et al. | 380/25 |
| 5,317,636 | 5/1994 | Vizcaino | 380/23 |
| 5,884,271 * | 3/1999 | Pitroda | 705/1 |
| 5,933,812 * | 8/1999 | Meyer et al. | 705/15 |

* cited by examiner

*Primary Examiner*—Michael Horabik
*Assistant Examiner*—M. Shimizu

(57) ABSTRACT

An intelligent credit card incudes a keypad for inputting numbers and other information, a processor for controlling the operation of the credit card, a power source, and an output device for selectively outputting the credit card number when the card is activated. The output device is a magnetic strip. A user inputs a sequence of numbers using the keypad. The received sequence of numbers are compared to a stored PIN number. If the sequence of numbers matches the PIN number, the card is activated, and the credit card number is output using the output device.

16 Claims, 5 Drawing Sheets

METHOD AND APPARATUS FOR MINIMIZING CREDIT CARD FRAUD

TECHNICAL FIELD

The present invention relates to preventing fraud, and more particularly, to a method and, apparatus for minimizing credit card fraud.

BACKGROUND OF THE INVENTION

Credit cards are frequently used to buy a wide variety of products and services. A credit card transaction is started when a consumer selects goods and/or services to be purchased. These goods and/or services are brought to a point of sale (POS) clerk who inputs/scans the information pertaining to the goods and/or services into a cash register. The clerk takes the credit card and swipes or runs the card through a card reader 20, illustrated in FIG. 1. The card reader 20 is connected to the electronic cash register via a cable 24 and is connected to a data transmission system via a cable 26. The consumer account is typically embossed on the card and also encoded in a magnetic strip on the back of a card. The card reader 20 stores the account information and the amount of the sale and transmits this information to a credit card authorization system. For a valid card and one that has not been reported as lost or stolen, the transaction is automatically signaled to the clerk with either a signal or light provided on LED outputs 28, or with an authorization code on a display that indicates that the transaction has been authorized.

The clerk has the consumer sign the receipt, and the clerk keeps a copy of the receipt and gives a copy of the receipt to the consumer. The clerk is required to examine the signature on the receipt and match it to the signature on the back of the card. This is rarely done. In fact, within several hours of obtaining a lost or stolen credit card, a thief typically can fraudulently charge several thousand dollars of goods and services before the notification process typically stops the use of that card. Therefore, a need exists for an improved system to minimize fraud in credit card transactions.

SUMMARY OF THE INVENTION

The problems of fraud in credit card transactions can be minimized in accordance with the principles of the present invention by providing an intelligent credit card that includes a keypad for inputting numbers and other information, a processor for controlling the operation of the intelligent credit card, and a battery or other power source for providing electrical power.

The intelligent credit card of the present invention includes an output device for selectively outputting the credit card number when the card is activated. In one embodiment, a magnetic strip is activated by an electrical current. Once activated, the magnetic strip outputs the card number encoded thereon. In another embodiment, the credit card includes one or more electrical contacts for outputting the credit card number as electrical signals when the card is activated. In yet another embodiment, the credit card includes one or more optical transmitting devices for outputting the credit card number as optical signals when the card is activated.

The card is initially in a de-activated state in which the card is unreadable by a card reader. When the user uses the credit card, the user first clears the card with the clear key and then inputs a sequence of digits using the keypad. The received sequence of digits is compared to a stored PIN and if the received digits match the stored PIN, the processor activates the credit card.

DETAILED DESCRIPTION

Figure 2A:
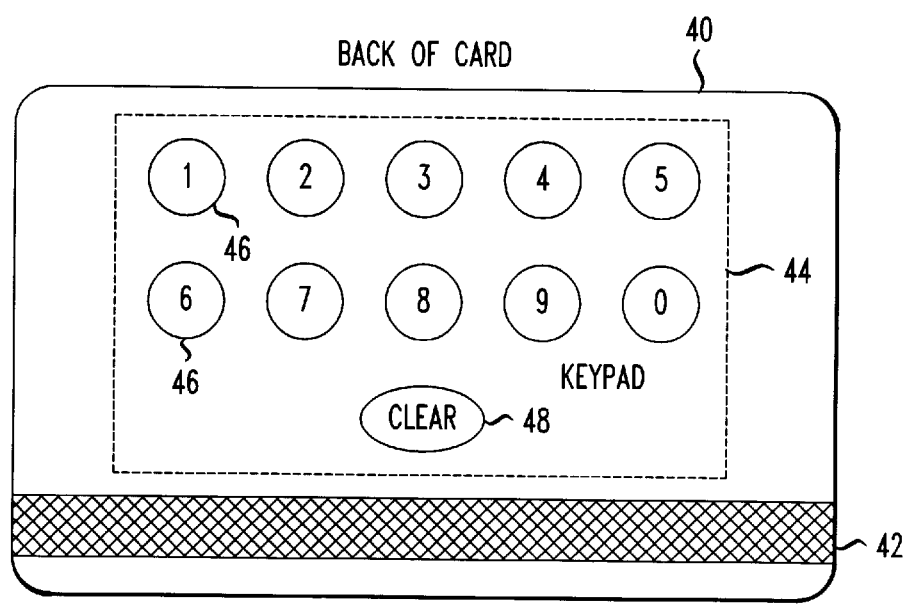
FIG. 2A illustrates the back of an intelligent credit card according to an embodiment of the present invention.

Referring to the drawings in detail, wherein like numerals indicate like elements, FIG. 2A illustrates the back of an intelligent credit card according to an embodiment of the present invention. The back 40 of intelligent credit card 30 includes a keypad 44 for inputting numbers and other information. Keypad 44 includes a plurality of number keys 46 and a clear key 48. Clear key 48 can be used to clear a sequence of numbers entered using number keys 46. Keypad 44 can also include an enter key (not shown). The back 40 of credit card 30 also includes a magnetic strip 42. The credit card number for credit card 30 is encoded in magnetic strip 42. The credit card number is output from the magnetic strip 42 when magnetic strip 42 is activated. Intelligent credit card 30 can be approximately the same size as a conventional credit card.

Figure 2B:
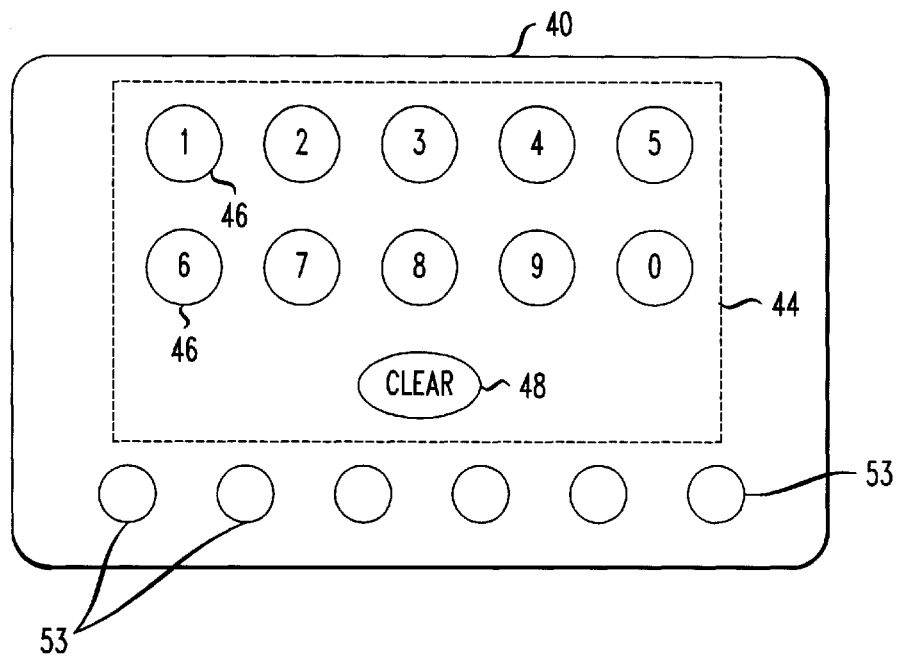
FIG. 2B illustrates the back of an intelligent credit card according to another embodiment of the present invention.

FIG. 2B illustrates the back of an intelligent credit card 30 according to another embodiment of the present invention. The credit card 30 of the embodiment of FIG. 2B is the same as the credit card 30 illustrated in FIG. 2A, except the magnetic strip 42 is replaced with one or more electrical contacts 53. The electrical contacts 53 can be used to selectively output the credit card number as a plurality electrical signals when the card is activated.

Figure 2C:
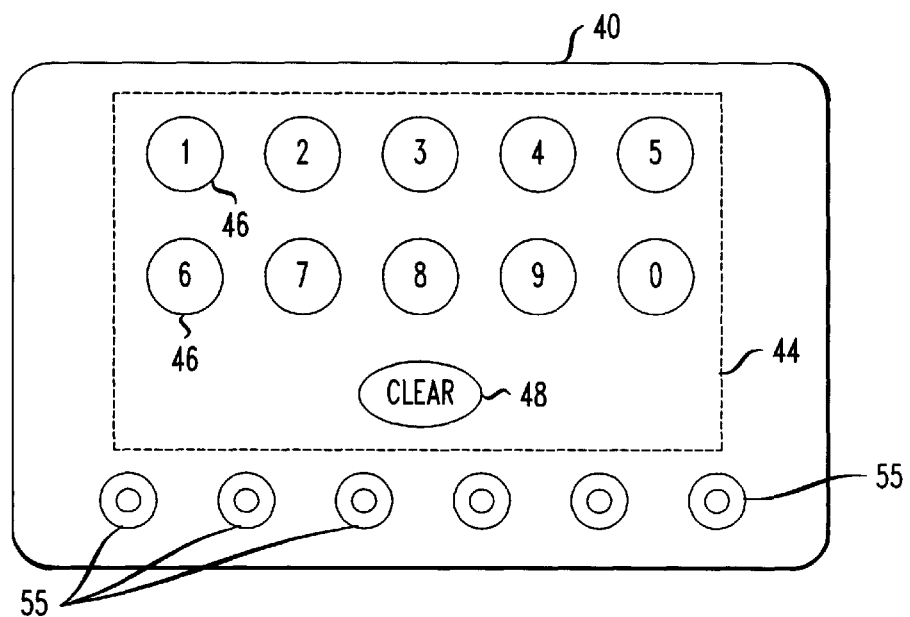
FIG. 2C illustrates the back of an intelligent credit card according to yet another embodiment of the present invention.

FIG. 2C illustrates the back of an intelligent credit card 30 according to yet another embodiment of the present invention. The credit card 30 of the embodiment of FIG. 2C is the same as the credit card 30 illustrated in FIG. 2A, except the magnetic strip 42 is replaced with one or more optical transmitting devices 55. The optical transmitting devices 55 can be used to selectively output the credit card number as a plurality of optical signals when the card is activated. However, the credit card 30 of FIG. 2A that includes a magnetic strip 42 has the advantage of being compatible with current magnetic card readers.

Figures 3, 4:
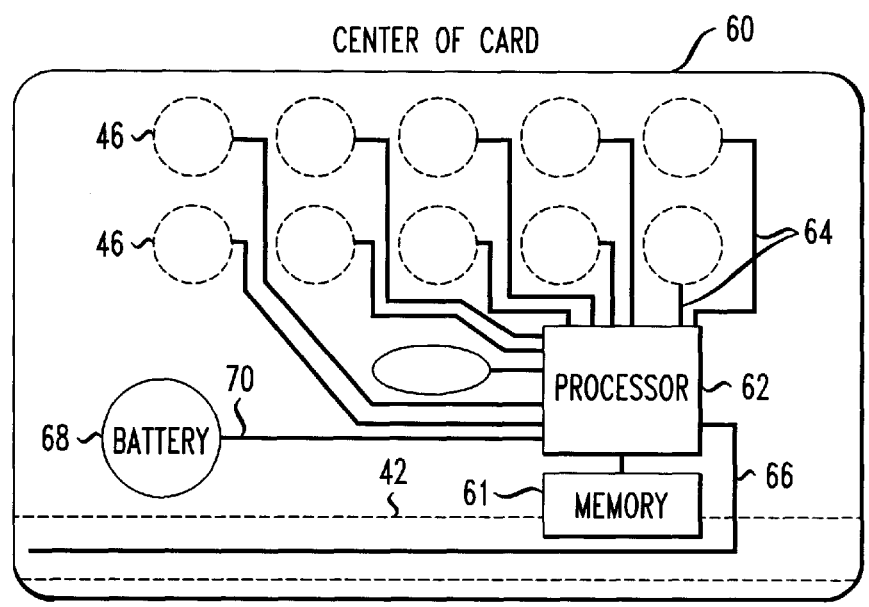
FIG. 3 illustrates the center of an intelligent credit card according to the embodiment of FIG. 2A of the present invention.
FIG. 4 illustrates the front of an intelligent credit card according to the embodiments of the present invention illustrated in FIGS. 1–2C and FIG. 3.

FIG. 3 illustrates the center 60 of the intelligent credit card 30 according to the embodiment of FIG. 2A. The center 60 of credit card 30 includes a processor 62 for controlling operation of intelligent credit card 30. Processor 62 can be, for example, a micro-controller, which includes random access memory (RAM) and Read Only Memory (ROM). An external memory 61 can be connected to processor 62. Memory 61 can include, for example, RAM and/or ROM. A plurality of wires 64 connect the number keys 46 and clear key 48 of keypad 44 to processor 62. A battery 68 provides power to processor 62 and magnetic strip 42 of credit card 30. Battery 68 can also provide power to electrical contacts 53 and optical transmitting devices 55, under control of processor 62.

Instead of a battery, other types of power sources can be used, such as photocells, or the like. Also, card 30 can include an inductive device for providing power from a card reader. The inductive device converts alternating current (AC) power provided from the card reader to direct current (DC) power. The inductive device can provide power to card 30 while card 30 is inserted or plugged into a card reader. An example of an inductive device is described in U.S. Pat. No. 4,692,604 to Robert L. Billings, incorporated by reference herein.

Battery 68 is connected to processor 62 via wire 70. A wire 66 connects processor 62 to magnetic strip 42. Processor 62 can apply a current to magnetic strip 42 via wire 66 to thereby activate magnetic strip 42. When activated, magnetic strip 42 outputs the credit card number which is encoded thereon. Alternatively, a wire and a switch could be connected between battery 68 and magnetic strip 42. The switch could be operable under control of processor 62 for selectively activating or de-activating magnetic strip 42 by closing and opening the switch, respectively.

According to the intelligent credit card 30 illustrated in FIG. 2B, processor 62 is coupled to electrical contacts 53. Processor 62 controls the output of the credit card number on the electrical contacts 53. Similarly, in the intelligent credit card 30 illustrated in FIG. 2C, the processor 62 is coupled to the optical transmitting devices 55 for controlling the output of the credit card number from the optical transmitting devices 55.

According to the embodiment of FIG. 2B, electrical contacts 53 can directly contact corresponding electrical contacts on card reader 20 to transfer information between card reader 20 and the credit card 30. However, direct physical contact can cause wear and tear on contacts 53. Therefore, according to an alternative embodiment of the present invention, information can be transferred between card 30 and card reader 20 through a capacitive coupling or interconnect between credit card 30 and card reader 20. For example, the present invention can include a capacitive interconnect as described in U.S. Pat. No. 4,931,991 to George B. Cvijanovich, hereby incorporated by reference.

Figure 1:
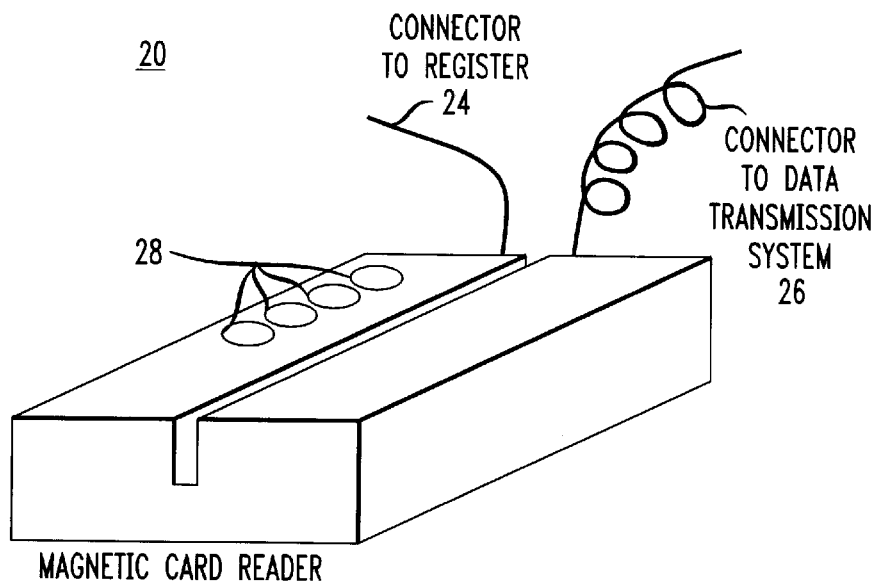
FIG. 1 is a block diagram of a credit card reader.

FIG. 4 illustrates the front 80 of intelligent credit card 30 according to the embodiments of the present invention illustrated in FIGS. 1–3. The front 80 of the credit card 30 includes the credit card number 84 of the credit card, the credit card holder's name 82 and the expiration date of the credit card 86. This information can be embossed on the front 80 of intelligent credit card 30. Additional information can be similarly embossed on the front 80 of credit card 30.

Figure 5:
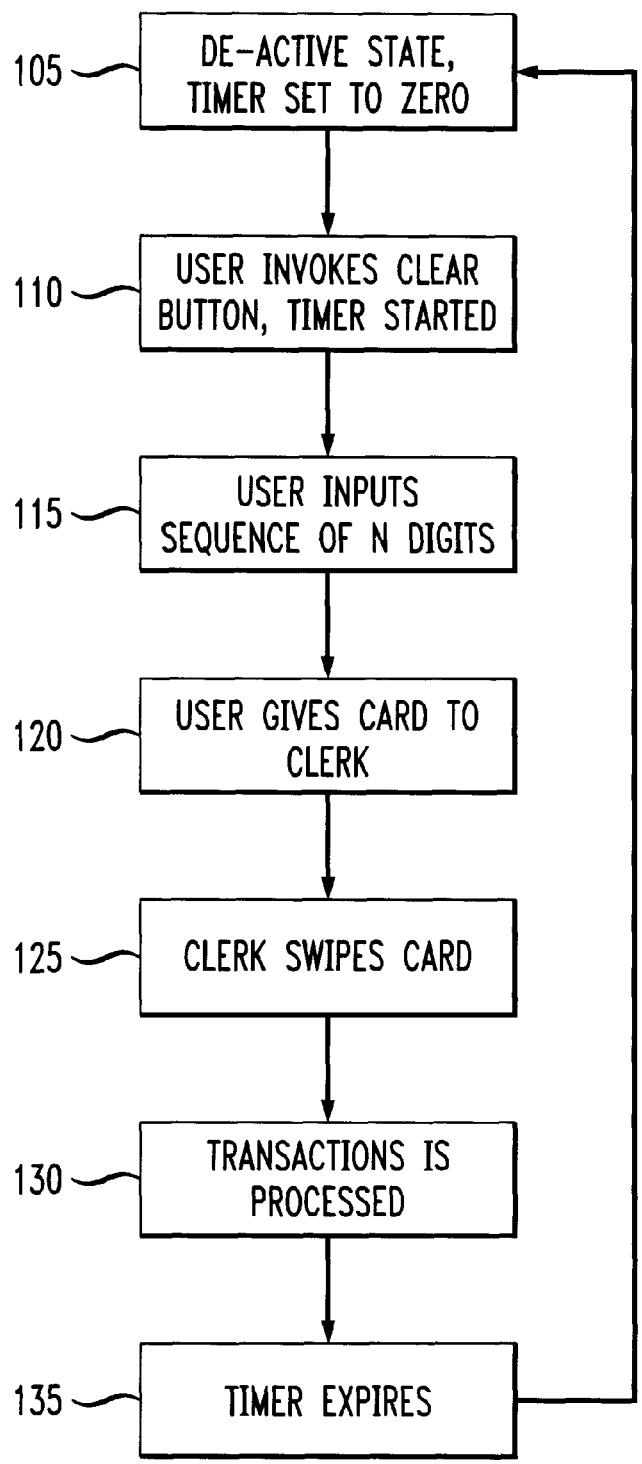
FIG. 5 is a flow chart illustrating the operation of the intelligent credit card according to an embodiment of the present invention.

The operation of intelligent credit card 30 according to an embodiment of the present invention will now be described. FIG. 5 is a flow chart illustrating the operation of intelligent credit card 30 according to an embodiment of the present invention. At. Step 105, the card is de-activated and is in an unusable state. In the embodiment of FIG. 2A, the processor 62 does not supply current to magnetic strip 42. By not supplying current to magnetic strip 42, magnetic strip 42 is de-activated, which renders the magnetic strip 42 unreadable by the credit card reader 20. In the embodiment of FIG. 2B, the credit card number is not output on the electrical contacts 53. In the embodiment of FIG. 2C, the credit card number is not output on the optical transmitting devices 55.

Also, at step 105, a personal identification number or PIN is stored in the memory or a register of processor 62. Processor 62 also maintains a timer to set a time limit for the activation of the credit card 30. If the timer expires or reaches a predetermined value, the processor 62 deactivates the credit card. In the embodiment of FIG. 2A, the processor 62 de-activates the magnetic strip 42 after the timer expires or reaches a predetermined value. In the embodiments of FIGS. 2B and 2C, the processor controls the electrical contacts 53 or devices 55 to discontinue outputting the credit card number after the time expires. The timer ensures that the credit card 30 can be activated only for a limited time period after the user presses the clear key 48. At Step 105, the timer is initialized to zero.

At Step 110, the user presses the clear key 48 and the timer is started to track the elapsed time after pressing of the clear key 48.

At Step 115, the user inputs a sequence of digits using number keys 46 on keypad 44. The processor 62 receives the sequence of numbers input by the user and compares the received sequence of numbers to the stored PIN. If there is a match between the received sequence of numbers and the stored PIN number, the processor 62 activates the credit card 30. In the credit card of FIG. 2A, the processor activates the credit card by applying a current to magnetic strip 42 along wire 66. By applying a current to magnetic strip 42, the magnetic strip is activated to output the credit card number encoded thereon.

The processor 62 activates the credit card 30 of FIG. 2B by outputting the credit card number as electrical signals on the electrical contacts 53. The processor 62 activates the credit card 30 of FIG. 2C by outputting the credit card number from the optical transmitting devices 55 as one or more optical signals.

If there is no match found between the received sequence of numbers and the stored PIN number, processor 62 does not activate credit card 30, and credit card 30 remains in the de-activated state.

At Step 120, the user gives the card to the clerk. At Step 125, the clerk swipes or runs the intelligent credit card 30 of FIG. 2A through the magnetic card reader 20. Similarly, an electrical card reader is used to read the credit card of FIG. 2B, and an optical card reader is used to read the credit card of FIG. 2C.

At Step 130, the information describing the credit card number and the transaction amount is transmitted to a credit card authorization system and is processed as a standard credit card transaction. If the credit card 30 has been properly activated through the entering of a valid PIN number, the transaction is automatically signaled to the clerk using either an authorization code or a light signal on LED 28 of magnetic card reader 20. If the credit card 30 is not activated, the account information and transaction amount is not transmitted to the authorization system and no authorization code or authorization signal is received by the clerk at the card reader.

At Step 135 the timer maintained by processor 62 expires or reaches a pre-determined value, causing processor 62 to de-activate credit card 30. The timer operates to automatically limit the amount of time in which the credit card 30 is activated.

The present invention includes several advantages. First, because the authentication information (e.g., PIN) is known only to the holder of the credit card, the present invention improves system security and decreases the potential for credit card fraud. The user is required to input the PIN into the card 30 before the card can be read. Moreover, the intelligent credit card 30 of the present invention illustrated FIG. 2A does not require changes or updates to current credit card transaction systems (e.g., current magnetic credit card readers) and their associated data bases. Third, the amount of time in using the system of the present invention is the same as compared to the processing of the card by the POS clerk and the data transmission to the credit card authorization system required by prior art credit cards. The additional time for the consumer to input his or her PIN into the intelligent credit card 30 does not increase the data processing or transmission time for the credit card authorization system.

Figure 6:
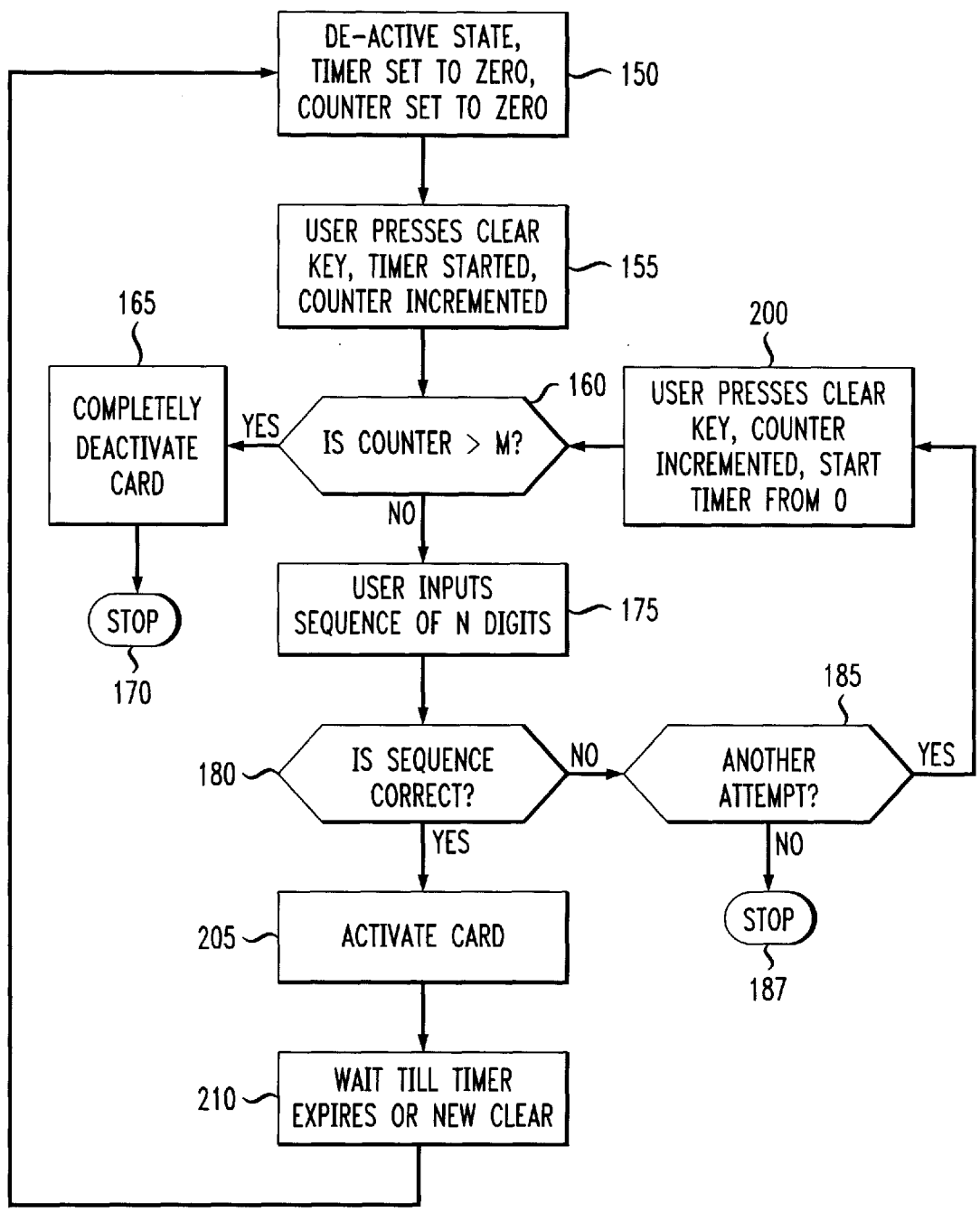
FIG. 6 is a flow chart illustrating the operation of the intelligent credit card according to another embodiment of the present invention.

FIG. 6 is a flow chart illustrating the operation of the intelligent credit card 30 according to another embodiment of the present invention. The timer described above is also maintained by processor 62 in the embodiment of FIG. 6 to limit the amount of time in which the card 30 can be activated. In addition, processor 62 maintains a counter to limit the number of consecutive wrong attempts that may be used to enter a correct PIN.

At Step 150, the credit card 30 is de-activated and processor 62 resets the timer and the counter both to zero.

At Step 155, the credit card user presses the clear key 48 which starts the timer and increments the counter.

At Step 160, processor 62 determines whether the counter is greater than a pre-determined number of attempts M. If the number of attempts indicated by the counter is greater than M, then the process proceeds to Step 165 and the processor 62 completely de-activates the card 30 and the process stops, Step 170.

The counter is designed to prevent a thief from repeatedly attempting to use a stolen credit card with a number of different PIN numbers. When the number of invalid attempts using the credit card (as measured by the counter) exceeds the pre-determined number M, the credit card is completely de-activated and rendered useless. Thereafter, even if a user inputs the correct PIN number, the card is not activated.

At Step 160, if processor 62 determines that the number of attempts indicated by the counter is less than or equal to the pre-determined value M, then the process proceeds to Step 175.

At Step 175, the credit card user inputs a sequence of digits using the number keys 46.

At Step 180, processor 62 receives the inputted sequence of digits and compares the digits to the stored PIN number. If the received sequence of digits matches the stored PIN number, then the processor 62 activates the credit card 30, step 205. At Step 210, the credit card remains activated until the timer expires or until the user presses the clear key 48. After the timer expires or after the clear key 48 is pressed, the credit card 30 is de-activated and returns to Step 150 of FIG. 6.

At Step 180, if the received sequence of digits does not match the stored PIN number, then the process proceeds to Step 185. At Step 185, if no further attempts will be made to input the correct PIN number, the process stops, Step 187. If another attempt will be made, the process proceeds to step 200.

At Step 200, the user presses the clear key 48 to indicate to the credit card 30 that a new sequence of numbers will be input. In response to pressing the clear key 48 at Step 200, the processor 62 increments the counter indicating the number of attempts that have been made to input the correct PIN number, and the timer is started from zero. However, the counter is not reset. The only time the counter is reset is after receiving the correct PIN number.

At Step 160, the updated counter value is compared to the pre-determined value M. If the counter value is greater than the pre-determined value M, the credit card 30 is completely de-activated in Step 165 and the process stops, Step 170. If the counter value indicating the number of attempts is less than or equal to the pre-determined value M, the user inputs the new sequence of digits at Step 175 using the number keys 46. The process shown in the loop including steps 180, 185, 200, 160 and 175 repeats until either the correct sequence of digits is input and the card is activated at Step 205, or the number of attempts indicated in the counter exceeds the pre-determined value M. When the number of attempts exceeds the pre-determined value M, the credit card 30 is completely de-activated at Step 165.

The intelligent credit card 30 of the present invention incudes a keypad 44 for inputting numbers and other information. A processor 62 controls the operation of the intelligent credit card 30. A battery 68 is connected to the processor 62 for providing electrical power. An output device is provided for selectively outputting the credit card number. In one embodiment, a magnetic strip 42 is activated by an electrical current. activated, the magnetic strip 42 outputs the card number encoded thereon. In another embodiment, the credit card 30 includes one or more electrical contacts 53 connected to processor 62. When the card 30 is activated, the credit card number is output on the electrical contacts 53 as electrical signals. In yet another embodiment, the credit card includes one or more optical transmitting devices 55 connected to the processor 62. When the card is activated, the credit card number is output from the optical transmitting devices 55 as optical signals.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An intelligent credit card comprising:

a keypad;

a power source;

a magnetic strip encoded with a predetermined credit card number, wherein said credit card number is readable from said magnetic strip only when said magnetic strip is excited by said power source; and a processor coupled to the keypad, the magnetic strip and the power source, wherein said processor causes said magnetic strip to be excited by said power source for a predetermined period of time when the processor determines that a correct Personal Identification Number has been entered at the keypad.

2. The intelligent credit card of claim 1 wherein the credit card is approximately the same size as a conventional credit card.

3. The intelligent credit card of claim 1 wherein said keypad comprises a membrane keypad.

4. The intelligent credit card of claim 1 wherein said processor comprises a micro controller.

5. An intelligent credit card comprising:

a keypad;

a power source;

a magnetic strip encoded with a predetermined credit card number, wherein said credit card number is readable from said magnetic strip only when said magnetic strip is excited by said sower source;

a memory storing a Personal Identification Number; and a processor adapted to receive an input number from said keypad, compare the input number to the Personal Identification Number that is stored in said memory, and activate said magnetic strip for a predetermined period of time if the input number corresponds to the stored Personal Identification Number, said processor coupled to said keypad, said power source and said memory.

6. The intelligent credit card of claim 5 wherein said step of deactivating comprises the step of not supplying current to the magnetic strip.

7. The intelligent credit card of claim 5 wherein said step of activating comprises the step of supplying a current to the magnetic strip if the received input number matches the stored PIN.

8. The intelligent credit card of claim 5 wherein said step of activating comprises the step of supplying, under control of the processor, a current from the processor to the magnetic strip to activate the magnetic strip if the received input number matches the stored PIN.

9. An intelligent card system comprising:

a magnetic strip encoded with a predetermined number, wherein said number is readable from said magnetic strip only when said magnetic strip is activated;

means for inputting a number;

means for storing a Personal Identification Number;

means for comparing the inputted number to the stored Personal Identification Number;

means for activating the magnetic strip for a predetermined period of time if the input number matches the stored Personal Identification Number.

10. The intelligent credit card of claim 9 wherein said means for inputting a number comprises a keypad.

11. The intelligent credit card of claim 9 wherein said means for storing a PIN comprises a processor.

12. The intelligent credit card of claim 9 wherein said means for comparing comprises a processor.

13. The intelligent credit card of claim 9 wherein said means for activating comprises a processor.

14. A method for minimizing credit card fraud comprising:

receiving an input number from a keypad;

comparing said input number to a Personal Identification Number that is stored in a memory; and activating, for a predetermined period of time, a magnetic strip that has been encoded with a predetermined number if said number corresponds to said Personal Identification Number.

15. The method of claim 14 wherein said step of activating comprises the step of supplying a current, under control of a processor, to the magnetic strip to activate the magnetic strip.

16. The method of claim 14 and further comprising the steps of:

allowing a user a limited number of attempts to input a number that matches the PIN;

completely deactivating the credit card if the user fails to enter a matching number within the limited number of attempts.

* * * * *